US011761365B2

(12) United States Patent
Liu et al.

(10) Patent No.: US 11,761,365 B2
(45) Date of Patent: Sep. 19, 2023

(54) EXHAUST GAS AND REDUCTANT MIXER FOR AN AFTERTREATMENT SYSTEM

(71) Applicant: Cummins Inc., Columbus, IN (US)

(72) Inventors: Z. Gerald Liu, Madison, WI (US); Apoorv Kalyankar, Madison, WI (US); Niklas Schmidt, Madison, WI (US); Achuth Mannannur, Verona, WI (US)

(73) Assignee: CUMMINS INC., Columbus, IN (US)

(*) Notice: Subject to any disclaimer, the term of this patent is extended or adjusted under 35 U.S.C. 154(b) by 0 days.

(21) Appl. No.: 17/642,628

(22) PCT Filed: Sep. 11, 2020

(86) PCT No.: PCT/US2020/050318
§ 371 (c)(1),
(2) Date: Mar. 11, 2022

(87) PCT Pub. No.: WO2021/050819
PCT Pub. Date: Mar. 18, 2021

(65) Prior Publication Data
US 2022/0349331 A1 Nov. 3, 2022

Related U.S. Application Data

(60) Provisional application No. 62/899,979, filed on Sep. 13, 2019.

(51) Int. Cl.
F01N 3/28 (2006.01)
F01N 3/20 (2006.01)

(52) U.S. Cl.
CPC .......... F01N 3/2892 (2013.01); F01N 3/2066 (2013.01); F01N 2240/20 (2013.01); F01N 2610/02 (2013.01); F01N 2610/1453 (2013.01)

(58) Field of Classification Search
CPC .. F01N 3/2066; F01N 3/2892; F01N 2240/20; F01N 2610/02; F01N 2610/1453
See application file for complete search history.

(56) References Cited

U.S. PATENT DOCUMENTS 10,287,948 B1  5/2019 Moulieres et al.
10,632,430 B1  4/2020 Liu et al.
(Continued)

FOREIGN PATENT DOCUMENTS

CN   105143628 A   12/2015
CN   106968765 A    7/2017
(Continued)

OTHER PUBLICATIONS

International Search Report and Written Opinion for International Application No. PCT/US2020/050318, dated Dec. 8, 2020.

Primary Examiner — Audrey B. Walter
(74) Attorney, Agent, or Firm — Faegre Drinker Biddle & Reath LLP

(57) ABSTRACT

Apparatus and method for mixing reductant in an exhaust gas flow using virtual interception. Embodiments include an exhaust gas and reductant mixer comprising a body, a first flow device, and a reductant entry port. The body defines an exhaust gas flow path having a central portion. The first flow device swirls the exhaust gas in a circumferential direction with respect to the gas flow path. The reductant entry port introduces the reductant into the gas flow path at a location downstream from the first flow device and in an introduction direction (1) offset from the central portion, and (2) opposite the circumferential direction.

37 Claims, 8 Drawing Sheets

(56) References Cited

U.S. PATENT DOCUMENTS

| | | | |
|---|---|---|---|
| 11,268,424 B2* | 3/2022 | Kimura | F01N 3/2066 |
| 2017/0089246 A1* | 3/2017 | Greber | F01N 3/2073 |
| 2017/0152778 A1 | 6/2017 | Li et al. | |
| 2018/0306083 A1 | 10/2018 | Sampath et al. | |
| 2020/0325811 A1* | 10/2020 | Levin | F01N 13/08 |

FOREIGN PATENT DOCUMENTS

| | | | | |
|---|---|---|---|---|
| CN | 108708781 A | * | 10/2018 | F01N 3/2892 |
| CN | 111810276 A | | 10/2020 | |
| WO | 2018226626 A1 | | 12/2018 | |

* cited by examiner

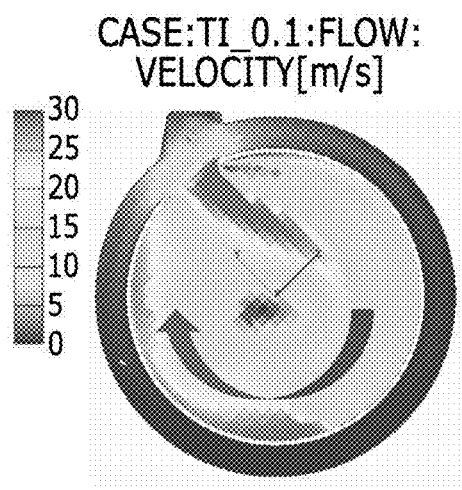 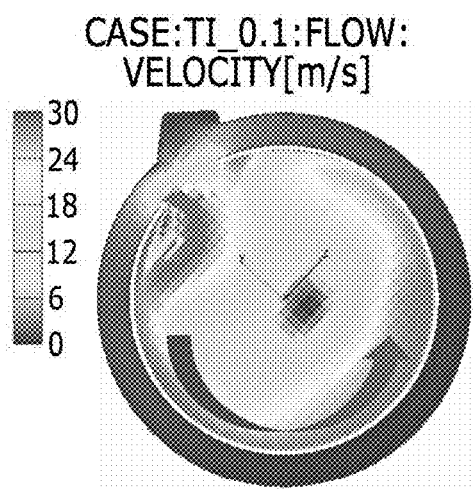
FIG. 8A  FIG. 8B
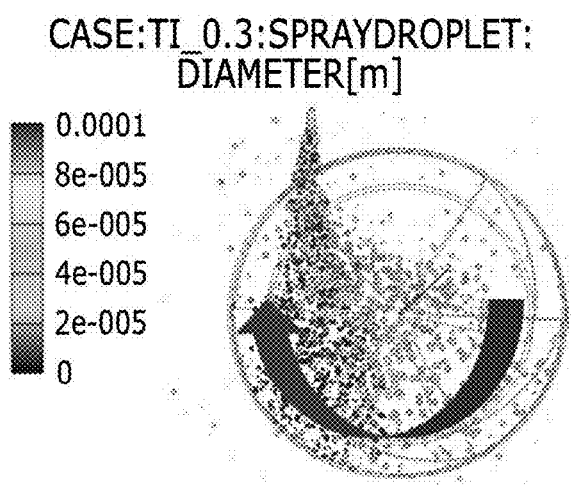 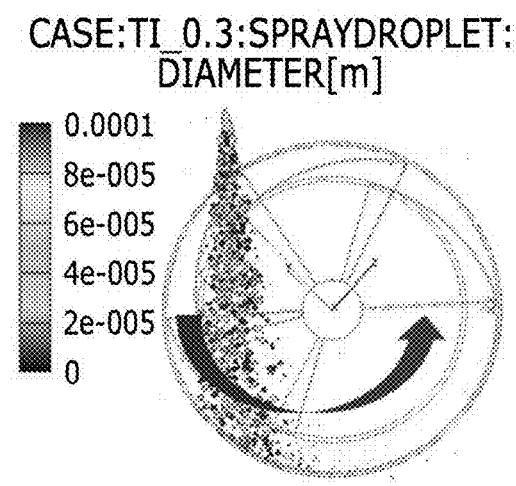
FIG. 9A  FIG. 9B
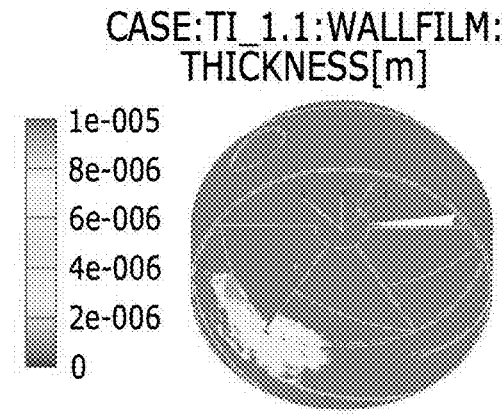 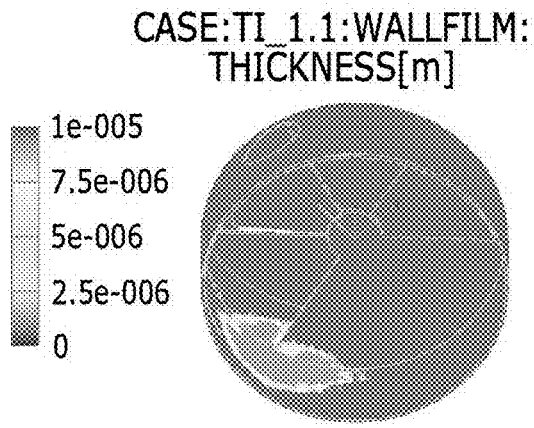
FIG. 10A  FIG. 10B

EXHAUST GAS AND REDUCTANT MIXER FOR AN AFTERTREATMENT SYSTEM

CROSS-REFERENCE TO RELATED APPLICATIONS

The present application claims priority to International Patent Application No. PCT/US2020/050318, filed Sep. 11, 2020, which claims priority to U.S. Provisional Application Ser. No. 62/899,979, entitled "EXHAUST GAS AND REDUCTANT MIXER FOR AN AFTERTREATMENT SYSTEM," filed on Sep. 13, 2019, the entire disclosures of which are hereby expressly incorporated herein by reference.

TECHNICAL FIELD

The disclosure relates generally to aftertreatment systems for internal combustion engines. More specifically, the disclosure relates to mixers and methods for mixing exhaust gases and reductant in aftertreatment systems.

BACKGROUND

Internal combustion engines such as diesel engines produce nitrogen oxide ($NO_x$) compounds that may be emitted in the exhaust. To reduce $NO_x$ emissions, the engine exhaust gases can be applied to aftertreatment systems that implement selective catalytic reduction (SCR) processes. SCR processes convert the $NO_x$ compounds into more neutral compounds, such as diatomic nitrogen or water, with the aid of a catalyst and a reductant. The catalyst may be included in a catalyst chamber of the aftertreatment system. The reductant, such as anhydrous ammonia, aqueous ammonia, diesel exhaust fluid (DEF) or aqueous urea, is typically introduced into the exhaust gas flow by dosing modules. The dosing modules can be located upstream or prior to the catalyst chamber, and vaporize or spray the reductant into the exhaust stream.

Systems and methods for mixing the exhaust gases and reductant are generally known and disclosed, for example, in PCT International Publication No. WO 2018/226626, which is incorporated herein in its entirety and for all purposes. There remains, however, a continuing need for improved aftertreatment systems. For example, there is a need for improved systems and methods for enhancing the efficiency and effectiveness of the SCR process.

SUMMARY

Disclosed embodiments of the invention include an apparatus and method for mixing reductant in an exhaust gas flow using virtual interception. The apparatus and method can virtually intercept and redistribute reductant droplets to deliver highly uniform flow and reductant profiles, thereby enhancing the efficiency and effectiveness of SCR processes.

For example, embodiments include an exhaust gas and reductant mixer comprising a body, a first flow device, and a reductant entry port. The body defines an exhaust gas flow path, wherein the exhaust gas flow path has a central portion. The first flow device swirls the exhaust gas in a circumferential direction with respect to the gas flow path. The reductant entry port introduces the reductant into the gas flow path at a location downstream from the first flow device and in an introduction direction (1) offset from the central portion, and (2) opposite the circumferential direction. Embodiments can be characterized by an angular offset between an axis of the reductant introduction direction and a mixer axis extending from the central portion of the flow path through the reductant entry port. Embodiments can also be characterized by a spatial offset between the axis of the inlet direction and a parallel mixer axis extending from the central portion of the exhaust gas flow path.

Embodiments also include a method for mixing reductant in an exhaust gas flow. The exhaust gas flow is swirled in a circumferential direction with respect to a flow path. The reductant is introduced into the swirling exhaust gas flow in a direction offset from a central portion of the flow path and opposite the circumferential direction of the flow.

Another example of an exhaust gas and reductant mixer in accordance with embodiments comprises: a body defining an exhaust gas flow path, wherein the exhaust gas flow path has a central portion; a first flow device to swirl the exhaust gas in a circumferential direction with respect to the gas flow path; and a reductant entry port to introduce the reductant into the gas flow path at a location downstream from the first flow device and in an introduction direction (1) offset from the central portion, and (2) opposite the circumferential direction.

In embodiments of this example, the first flow device comprises a plurality of vanes. Each of the vanes of the first flow device may define a vane angle between 45° and 89° with respect to the gas flow path. Each of the vanes of the first flow device may define a vane angle between 65° and 85° with respect to the gas flow path. Each of the vanes of the first flow device may define a vane angle between 70° and 80° with respect to the gas flow path.

In any of the above example embodiments, two or more of the vanes of the first flow device overlap one another in the circumferential direction. Alternatively or in addition, in embodiments two or more of the vanes of the first flow device have adjacent edges defining a gap in the circumferential direction.

In any of the above example embodiments, the reductant entry port and first flow device are configured to optimize mixing uniformity of the reductant in the exhaust gas flow. In embodiments, for example, the vanes of the first flow device extend around a portion less than 360° of a circumference of the gas flow path. For example, in embodiments the vanes of the first flow device extend around a portion between 130° and 230° of a circumference of the gas flow path. In embodiments the vanes of the first flow device extend around a portion between 170° and 190° of a circumference of the gas flow path.

Any of the above example embodiments may include a first blocking member in a circumferential portion of gas flow path where the vanes of the first flow device do not extend and upstream from the reductant entry port. In embodiments, for example, the first blocking member is located in a circumferential portion of the gas flow path corresponding to the location of the reductant entry port. In embodiments, the blocking member is located generally parallel to the first flow device.

In any of the above example embodiments the introduction direction is a direction about an axis between 5° and 85° away from an axis extending from the reductant entry port to the central portion of the gas flow path. For example, in embodiments the introduction direction is a direction about an axis between 25° and 35° away from an axis extending from the reductant entry port to the central portion of the gas flow path.

Any of the above example embodiments may include a doser for introducing a conical or fan shaped bolus of the reductant through the reductant entry port.

In any of the above example embodiments, the body includes an exhaust inlet portion upstream from the reductant entry port; and the first flow device is located at the exhaust inlet portion.

Any of the above example embodiments may include a second flow device at a location downstream from the reductant entry port to swirl the exhaust gas in a circumferential direction. In embodiments, the second flow device swirls the exhaust gas in the same circumferential direction that the first flow device swirls the exhaust gas. In embodiments, the second flow device swirls the exhaust gas in an opposite circumferential direction that the first flow device swirls the exhaust gas.

In any of the above example embodiments, the second flow device may comprise a plurality of vanes. In embodiments, for example, each of the second flow device vanes defines a vane angle between 45° and 89° with respect to the gas flow path. In embodiments, each of the second flow device vanes defines a vane angle between 55° and 75°, and optionally about 60° with respect to the gas flow path. In any of these example embodiments, two or more of the second flow device vanes overlap one another in the circumferential direction. Alternatively or in addition, two or more of the second flow device vanes have adjacent edges define a gap in the circumferential direction.

In any of the above example embodiments, the reductant entry port and second flow device are configured to optimize mixing uniformity of the reductant in the exhaust gas flow.

In any of the above example embodiments, the vanes of the second flow device extend around a portion of less than 360° of a circumference of the gas flow path. In embodiments, for example, the vanes of the second flow device extend around a portion of between 200° and 280° of a circumference of the gas flow path. In embodiments, for example, the vanes of the second flow device extend around a portion between 220° and 260° of a circumference of the gas flow path.

Any of the above example embodiments may include a second blocking member in a circumferential portion of gas flow path where the vanes of the second flow device do not extend and downstream from the reductant entry port. In embodiments, the second blocking member is located in a circumferential portion of the gas flow path corresponding the location of the reductant entry port. In embodiments, the second blocking member is located generally parallel to the vanes of the second flow device.

In any of the above example embodiments, a hub of one or both of the first flow device and the second flow device is radially offset from a mixer center axis.

In any of the above example embodiments, the mixer is free of splash plates.

Other examples comprise an exhaust aftertreatment system including the mixer in accordance with any of the above example embodiments.

Yet other examples comprise a method for mixing reductant in an exhaust gas flow, including: swirling the exhaust gas flow in a circumferential direction with respect to a flow path; and introducing the reductant into the swirling exhaust gas flow in a direction offset from a central portion of the flow and opposite the circumferential direction of the flow.

BRIEF DESCRIPTION OF THE DRAWINGS

FIGS. 8A and 8B are comparative illustrations of modeled flow velocity contours of a mixer in accordance with embodiments, and a mixer without virtual interception.

FIGS. 9A and 9B are comparative illustrations of modeled reductant particle distributions of a mixer in accordance with embodiments, and a mixer without virtual interception.

FIGS. 10A and 10B are comparative illustrations of modeled reductant wall film thicknesses of a mixer in accordance with embodiments, and a mixer without virtual interception.

DETAILED DESCRIPTION

Example Aftertreatment System

Figure 1:
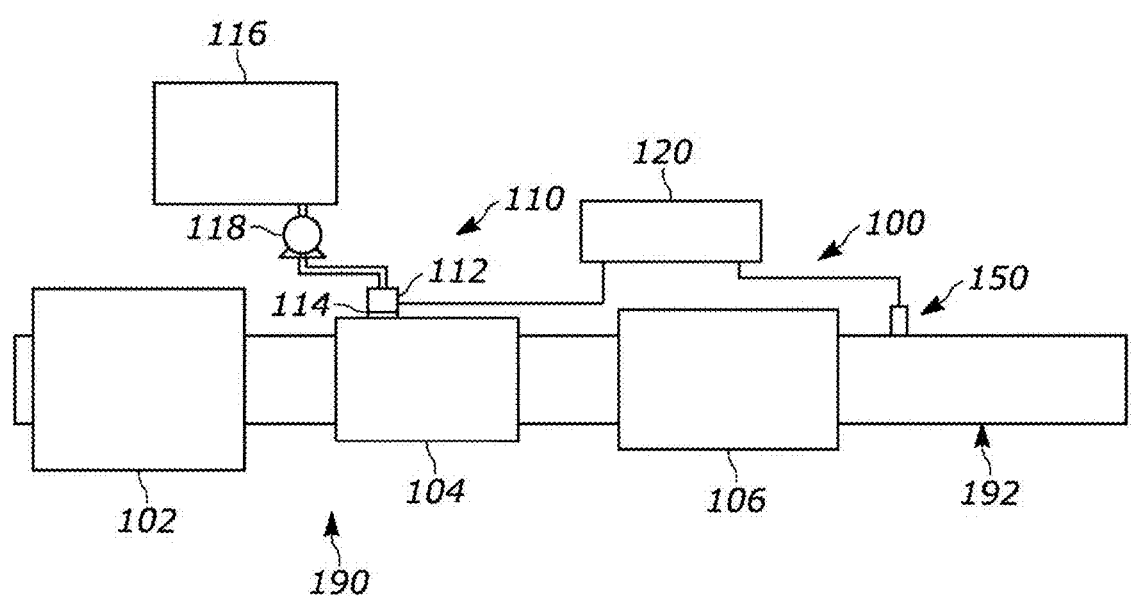
FIG. 1 is a diagrammatic illustration of an exhaust aftertreatment system in which apparatus and methods in accordance with disclosed embodiments can be incorporated or used.
Figure 2A:
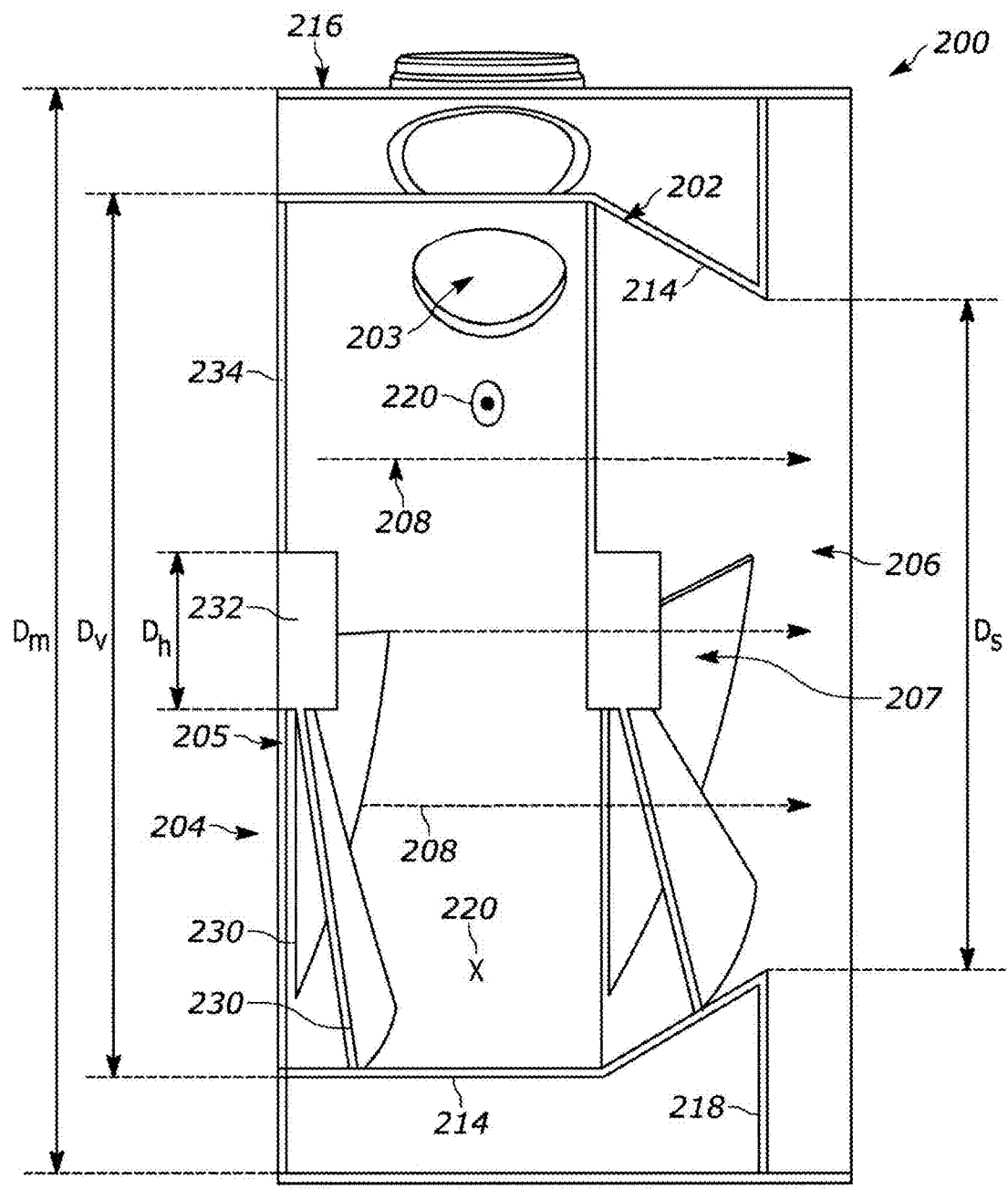
FIG. 2A is a cross-sectional view of a mixer in accordance with embodiments taken from a side of the mixer.
Figure 2B:
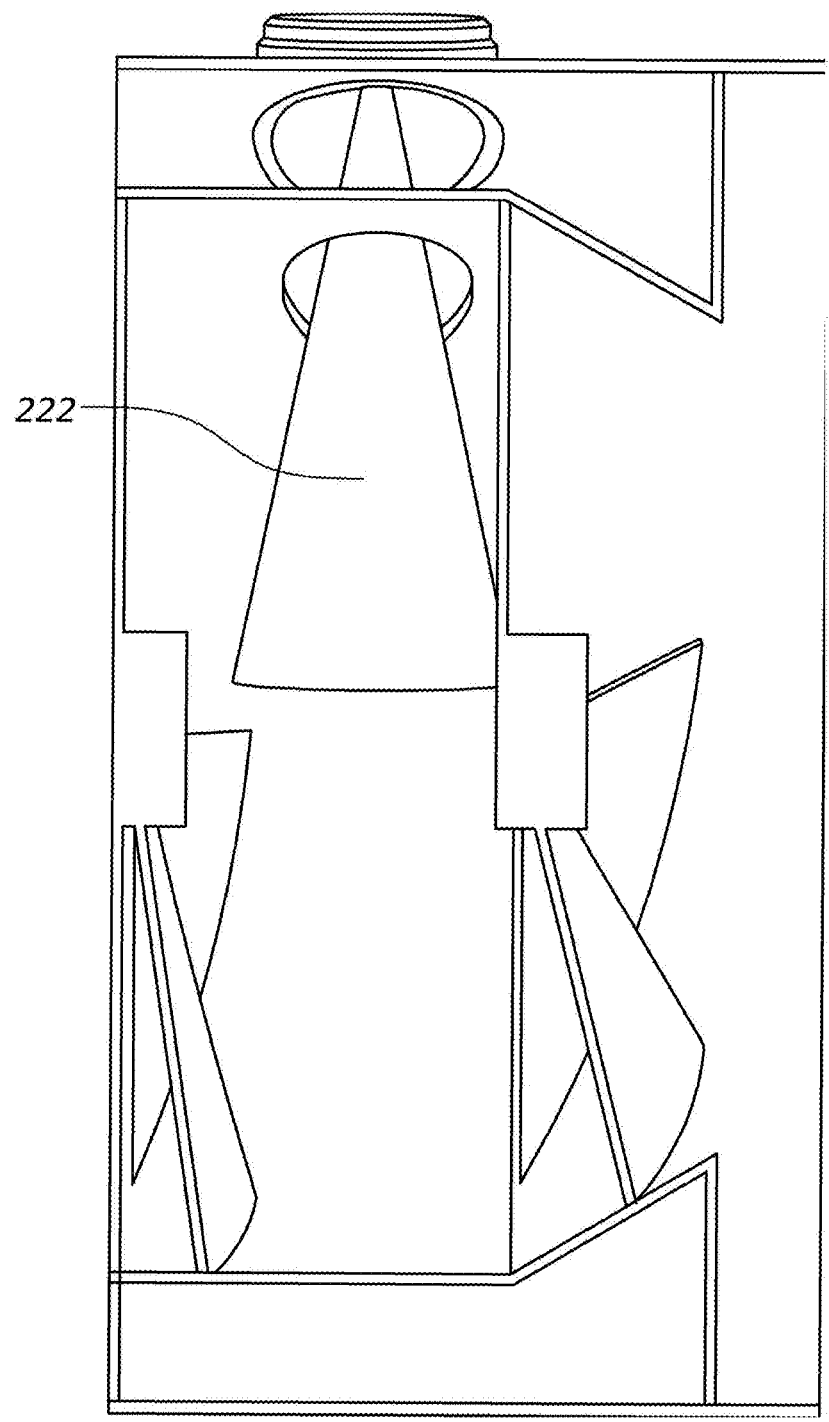
FIG. 2B is the cross-sectional view of the mixer shown in FIG. 2A, and also showing reductant introduced into the mixer.

FIG. 1 depicts an example of an exhaust aftertreatment system 100 in which exhaust gas and reductant mixers and methods in accordance with this disclosure can be incorporated and used. The aftertreatment system 100 has an example reductant delivery system 110 for an exhaust system 190. The aftertreatment system 100 includes a particulate filter, for example a diesel particulate filter (DPF) 102, the reductant delivery system 110, a decomposition chamber or reactor 104, a SCR catalyst 106, and a sensor 150. In some embodiments, the SCR catalyst 106 includes an ammonia slip catalyst (ASC).

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant, such as urea or Aqueous urea solution or Diesel Exhaust Fluid (DEF), into ammonia. The decomposition chamber 104 includes a reductant delivery system 110 having a doser or dosing module 112 configured to dose the reductant into the decomposition chamber 104 (for example, via an injector such as the injector described below). In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing NOx emissions and an outlet for the exhaust gas, NOx emissions, ammonia, and/or reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 on which the dosing module 112 is mounted. The dosing module 112 is fluidly coupled to one or more reductant sources 116. In some implementations, a pump 118 may be used to pressurize the reductant from the reductant sources 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR catalyst 106 is configured to assist in the reduction of NOx emissions by accelerating a NOx reduction process between the ammonia and the NOx of the exhaust gas into diatomic nitrogen and water. The SCR catalyst 106 includes an inlet in fluid communication with the decomposition chamber 104 from which exhaust gas and reductant are received and an outlet in fluid communication with an end of the exhaust system 190.

The exhaust system 190 may further include an oxidation catalyst (for example a diesel oxidation catalyst (DOC)) in fluid communication with the exhaust system 190 (e.g., upstream of the SCR catalyst 106 or the DPF 102) to oxidize hydrocarbons and carbon monoxide in the exhaust gas.

In some implementations, the DPF 102 may be positioned downstream of the decomposition chamber or reactor 104. For instance, the DPF 102 and the SCR catalyst 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190; for example, a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190.

Example Mixer

A mixer 200 in accordance with embodiments can be described with reference to FIGS. 2A, 2B, 3, 4 and 5. However, it is understood that the relevant structure in these and similar embodiments may constitute other aftertreatment components such as a SCR catalyst, a perforated tube, a pipe, a manifold, a decomposition chamber or reactor, a doser, a dosing module, and others. The mixer 200 is configured to receive exhaust gases (e.g., combustion gases from an internal combustion engine, etc.) and to provide the exhaust gases downstream with a substantially uniform flow distribution (e.g., flow profile, etc.). According to an example embodiment, the mixer 200 is additionally configured to selectively dose the exhaust gases with a reductant (e.g., urea, diesel exhaust fluid (DEF), AdBlue®, etc.). Because the mixer 200 provides a substantially uniform flow distribution of the exhaust gases and promotes mixing between exhaust gases and reductant by virtual interception, the mixer 200 may also provide the exhaust gases downstream with a substantially uniform reductant distribution (e.g., reductant profile, etc.). The illustrated embodiment of mixer 200 does not include splash plates to promote mixing of the reductant. Other embodiments (not shown) may include one or more splash plates.

As shown, the mixer 200 includes a body 202 having an inlet portion or port 204 and an outlet portion of port 206. The reductant entry port 203 extends through the body 202 between the inlet port 204 and outlet port 206. A first or upstream flow device 205 is located upstream from the reductant entry port 203, and is shown in the inlet port 204 in the illustrated embodiment. A second or downstream flow device 207 is located downstream from the reductant entry port 203, and is shown in the outlet port 206 in the illustrated embodiments. Other embodiments of the mixer 200 (not shown) do not have a second flow device such as 207.

The body 202 defines and constrains an exhaust flow path 208 (represented by broken arrows) extending between the inlet port 204 and the outlet port 206. The exhaust gas flow path 208 has a central portion 210 and peripheral portions 212. Body 202 is a tubular member having an outer wall 214 supported within a housing 216 by structures such as flanges 218. Body 202 has a generally circular cross section and defines a generally linear exhaust flow path 208 in the illustrated embodiments. In other embodiments (not shown) the body can have other cross-sectional shapes and the gas flow path can be non-liner or have non-linear components. For example, the body 202 can have conical, frustoconical, aerodynamic or other shapes. The body 202 is configured as a venturi body in the illustrated embodiment, and has an inlet port 204 diameter Dv that is larger than the outlet port 206 diameter Ds.

Figure 3:
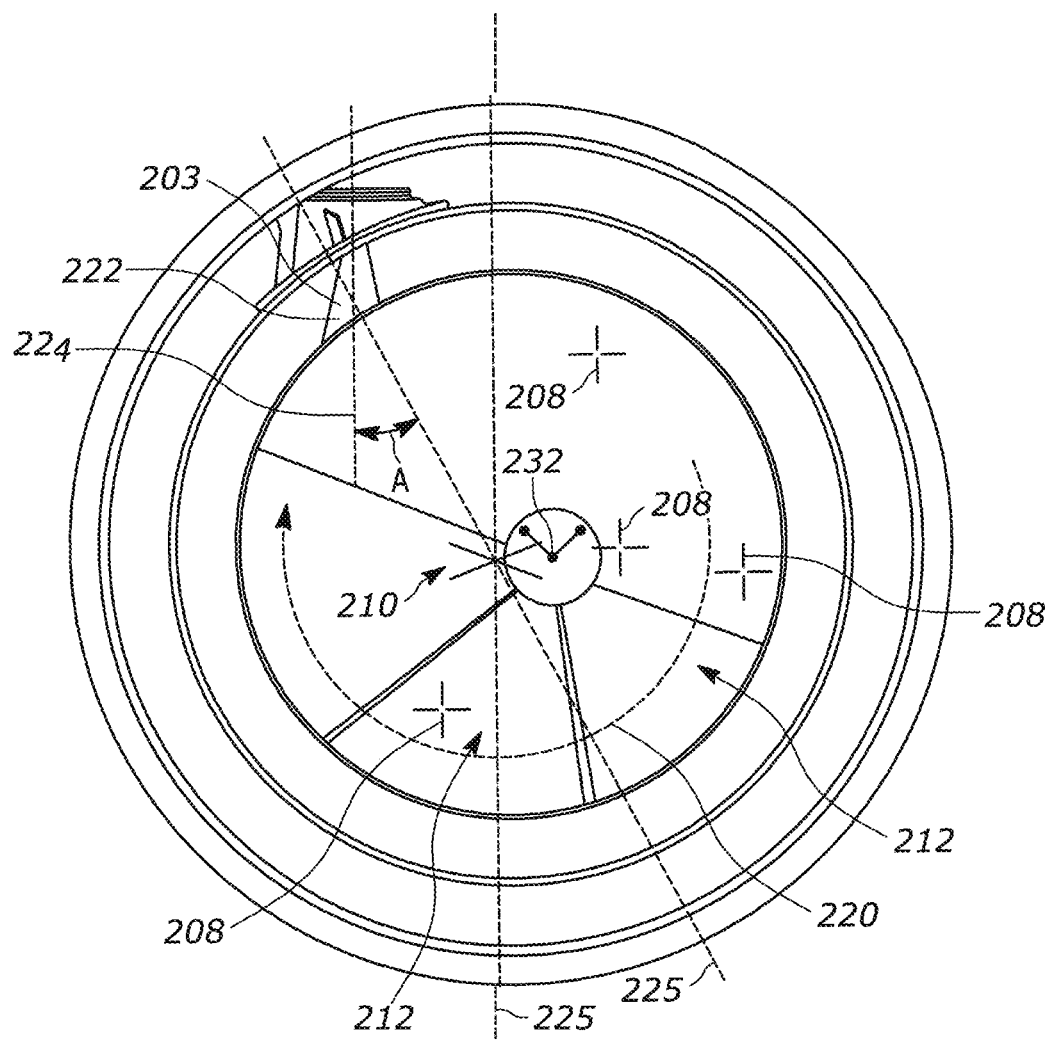
FIG. 3 is a partial cross-sectional view of the mixer shown in FIG. 2A, taken from an inlet port end of the mixer, and illustrating parameters of a convention that can be used to characterize features of embodiments.
Figure 4:
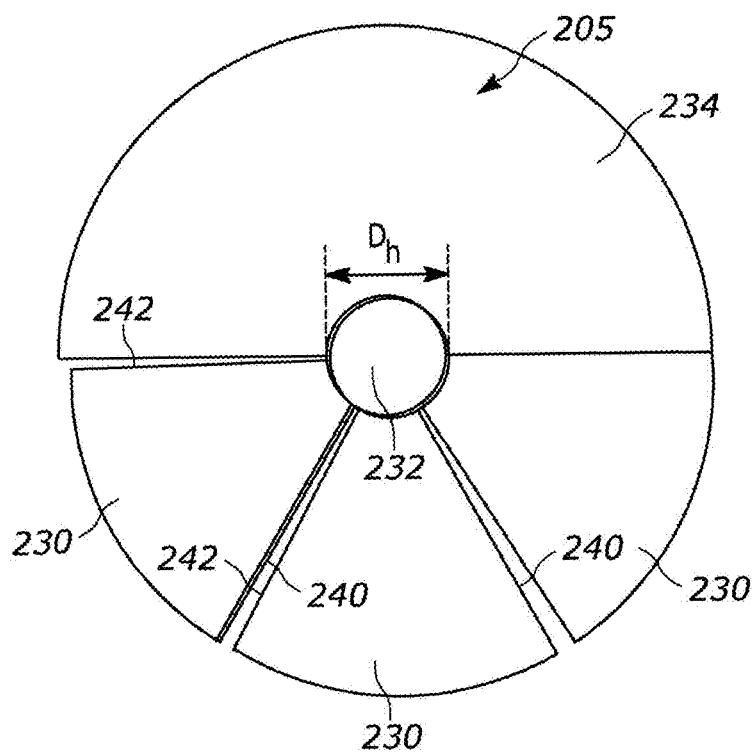
FIG. 4 is a detailed illustration of embodiments of a first flow device of the mixer.

Inlet port 204 receives a flow of exhaust gas which is then directed along the exhaust gas flow path 208. The first flow device 205 is configured to impart a swirl motion to the flow of exhaust gas within the mixer 200. As represented by the arrows 220, the swirl is in a first circumferential direction (e.g., clockwise in the illustrated embodiment and view) and generally perpendicular with respect to the exhaust gas flow path 208. Reductant 222 is introduced (e.g., by injection or spraying) through the reductant entry port 203 into the swirling exhaust gas flow downstream from the first flow device 205. In the illustrated embodiments the reductant 222 is introduced as a conically shaped bolus of increasing diameter with increasing distance from the reductant entry port 203. The introduction direction 224 of the reductant 222 is a direction generally opposite the circumferential direction of the exhaust gas swirl. As shown in FIG. 3, an axis of the introduction direction 224 of the reductant 222 is offset from the central portion 210 of the exhaust gas flow path 208 in a direction that is opposite the circumferential direction of the exhaust gas swirl. In the embodiment and view shown in FIG. 3 having the reductant entry port 203 in the upper left quadrant of the gas flow path (i.e., between 9:00 and 12:00 as defined by a clock convention) and with the clockwise exhaust gas swirl, the introduction direction 224 is toward and into the upper left quadrant of the gas flow path. The introduction direction 224 can, for example be defined as being offset from the central portion 210 of the exhaust gas flow path 208 (e.g., from a direction defined by a mixer axis 225 extending from the reductant entry port 203 through the central portion) by an angle A and in a direction that is opposite the first circumferential direction 210 (as noted below, the introduction direction 224 can be described using other conventions). The flow of the reductant 222 as it enters the mixer 200 therefore has components that are in a direction opposite the swirl direction. In FIG. 3 for example, which shows the mixer 200 from the side of the inlet port 204, the introduction direction 224 is a direction away from and on the left side of an axis 225 extending between the reductant entry port 203 and the central portion 210 of the exhaust gas flow path 208. In embodiments, and by this convention the introduction direction 224 is at an angle A between about 5° and 85° away from the central portion of the exhaust gas flow path 208. In other embodiments, the introduction direction 224 is at an angle A between about 25° and 35° away from the central portion of the exhaust gas flow path. In still other embodiments, the introduction direction 224 is at an angle A of about 30° from the central portion of the exhaust gas flow path (e.g., generally parallel to a vertical axis through the central portion in the view of FIG. 3).

First flow device 205 includes a plurality of vanes 230 to impart the swirl motion to the flow exhaust gas in the illustrated embodiment. Although three vanes 230 are shown in the illustrated embodiments, other embodiments have more or fewer vanes. As shown for example in FIG. 4, vanes 230 extend radially from a central hub 232 and are arranged circumferentially around the hub. In the embodiment shown in FIG. 3, the hub 232 of the first flow device 205 is radially offset from the mixer center axis 225 and/or the central portion 210 of the exhaust flow path 208. In other embodiments (e.g., those shown in FIGS. 2A, 2B, 6 and 7), the hub 232 is located on the central axis 225 and/or the central portion 210 of the exhaust flow path 208. The vanes 230 are oriented at vane angles with respect to the hub 232. In embodiments, the vane angles of vanes 230 are between 45° and 89° with respect to the axis of the gas flow path 208 (by a convention where the major surface of the vanes are perpendicular to the gas flow path when at 90°). In other embodiments the vane angles of the vanes 230 are between 65° and 85° with respect to the axis of the gas flow path 208. In yet other embodiments the vane angles of the vanes 230 are between 70° and 80°, and optionally at about 75° with respect to the axis of the gas flow path 208. Each of the vanes in the plurality of vanes in the first flow device can have an angle different from another (e.g., within the range specified above).

The illustrated embodiments of the mixer 200 include a first flow device 205 with vanes 230 that extend around a portion of the gas flow path 208 that is less than 360° of the circumference of the gas flow path. In these embodiments a blocking member 234 that blocks or otherwise resists the flow of the exhaust gas extend around a portion of the gas flow path 208 not covered by the portion around which the vanes 230 extend. As perhaps best shown in FIGS. 2A and 2B, the blocking member 234 is located upstream from the reductant entry port 203 on a side of the mixer 200 where the reductant entry port is located. In the illustrated embodiments the blocking member 234 is a wall that extends from the hub 232 of the first flow device 205. In other embodiments (not shown) the blocking member is a component separate from the first flow device 205. In embodiments, the vanes 230 of the first flow device 205 extend around a portion between 130° and 230° of the circumference of the gas flow path 208. In other embodiments the vanes 230 of the first flow device 205 extend around a portion between 170° and 190° of the circumference of the gas flow path 208. In the illustrated embodiments, for example, the vanes 230 of the first flow device extend around a portion of about 180°.

Blades 230 have first or leading edges 240 (i.e., with respect to the swirl direction) that are adjacent to opposite second or trailing edges 242 of the adjacent blades. In the illustrated embodiments, there is no gap or overlap between the first and second edges 240, 242 of adjacent blades 230 of the first flow device 205. In other embodiments (not shown), the adjacent vanes are located with the respective first and second edges 240, 242 overlapping one another in the swirl direction. These and other embodiments can also include adjacent vanes with the respective first and second edges spaced apart from one another by gaps in the swirl direction.

Mixer 200 operates on a principle that can be described as virtual interception to mix the reductant into the gas flow. Droplets of the reductant are thereby distributed into the gas flow in a highly uniform manner upstream of the SCR catalysts, while at the same time minimizing pressure drops and risks associated with reductant build-up on surfaces such as inner walls of mixer 200. Efficiency and effectiveness of the SCR process are enhanced by this improved mixing. Parameters of any of one or more features of the mixer 200 can be selected to optimize the mixing uniformity. For example, parameters that can be adjusted include the size, number and vane angle of the vanes 230, the amount of overlap (or no overlap) of the vanes, the size of any gaps between the vanes, clocking of the vanes 230 relative to the reductant entry port 203, the size and location of any blocking member such as 234, and the introduction direction of the reductant.

Figure 5:
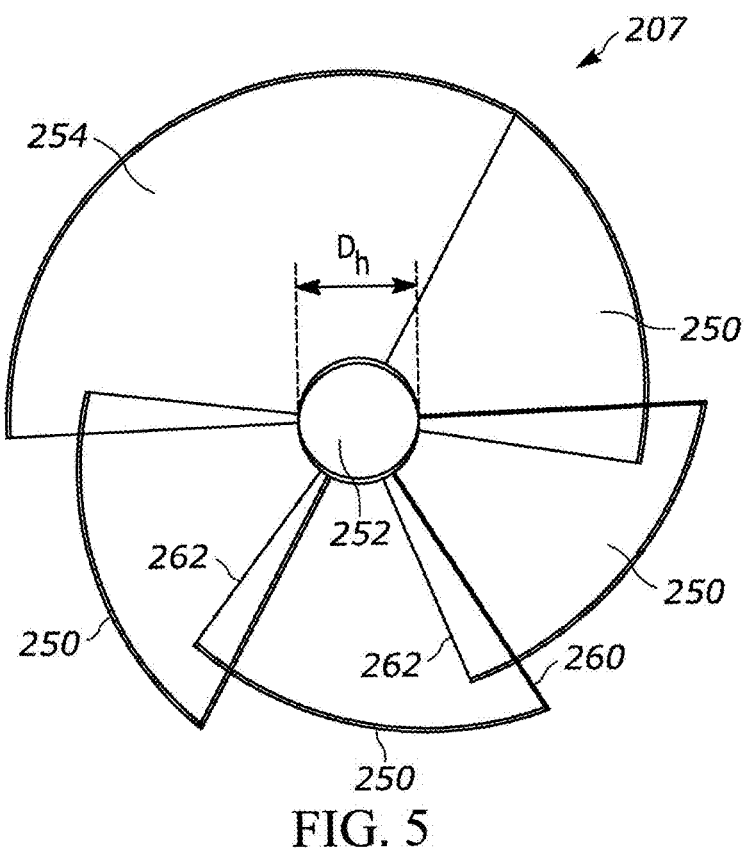
FIG. 5 is a detailed illustration of embodiments of a second flow device of the mixer.

FIG. 5 illustrates an example of the second flow device 207. Similar to the first flow device 205, the second flow device 207 includes a plurality of vanes 250 to impart a swirl motion to the exhaust gas flow. Although four vanes 250 are shown in the illustrated embodiments, other embodiments have more or fewer vanes. Vanes 250 extend radially from a central hub 252 and are arranged circumferentially around the hub. Like the hub 232 of the first flow device 207, the hub 252 of the second flow device 207 can be radially offset from the center axis 225 of the mixer 200. The vanes 250 are oriented at vane angles with respect to the hub 252. In embodiments, the vane angles of vanes 250 are between 45° and 89° with respect to the axis of the gas flow path 208. In other embodiments the vane angles of the vanes 250 are between 55° and 75° with respect to the axis of the gas flow path 208. In yet other embodiments the vane angles of the vanes 230 are between 60° and 70°, and optionally at about 65° with respect to the axis of the gas flow path 208. In the illustrated embodiments the second flow devise 207 is configured to swirl the exhaust gas in the exhaust gas flow path 208 downstream of the reductant entry port 203 in a direction that is the same direction that the first flow device 205 swirls the exhaust gas. In other embodiments (not shown) the second flow device is configured to swirl the exhaust gas in a direction that is opposite the swirl direction produced by the first flow device 205. Still other embodiments (not shown) do not include a second swirl device such as 207. Also similar to those of the first flow device 205 described above, each of the vanes 250 in the plurality of vanes in the second flow device 207 can have an angle different from another.

The illustrated embodiments of the mixer 200 includes a second flow device 207 with vanes 250 that extend around a portion of the gas flow path 208 that is less than 360° of the circumference of the gas flow path. In these embodiments a blocking member 254 that blocks or otherwise resists the flow of the exhaust gas extends around a portion of the gas flow path 208 not covered by the portion around which the vanes 250 extend. As perhaps best shown in FIGS. 2A and 2B, the blocking member 254 is located downstream from the reductant entry port 203 on a side of the mixer 200 where the reductant entry port is located. In the illustrated embodiments the blocking member 254 is a wall that extends from the hub 252 of the second flow device 207. In other embodiments (not shown) the blocking member is a component separate from the second flow device 207. In embodiments, the vanes 250 of the second flow device 207 extend around a portion between 200° and 280° of the circumference of the gas flow path 208. In other embodiments the vanes 250 of the second flow device 207 extend around a portion between 220° and 260° of the circumference of the gas flow path 208. In the illustrated embodiments, for example, the vanes 250 of the first flow device extend around a portion of about 240°.

Blades 250 have first or leading edges 260 (i.e., with respect to the swirl direction) that are adjacent to opposite second or trailing edges 262 of the adjacent blades. In the illustrated embodiments, the adjacent vanes 250 are located with the respective first and second edges 260, 262 overlapping one another. In other embodiments (not shown) there is no overlap between the first and second edges of adjacent blades 250 of the second flow device 207. In other embodiments (not shown), the adjacent vanes are located with the respective first and second edges spaced apart from one another by gaps in the swirl direction. Embodiments of mixer 200 such as that shown that include the second flow device 207 can enhance the mixing of the reductant into the exhaust gas. Parameters of the second flow device 207 can be selected in a manner similar to those of the first flow device 205 as described above to optimize the functionality of the second flow device.

Figure 6:
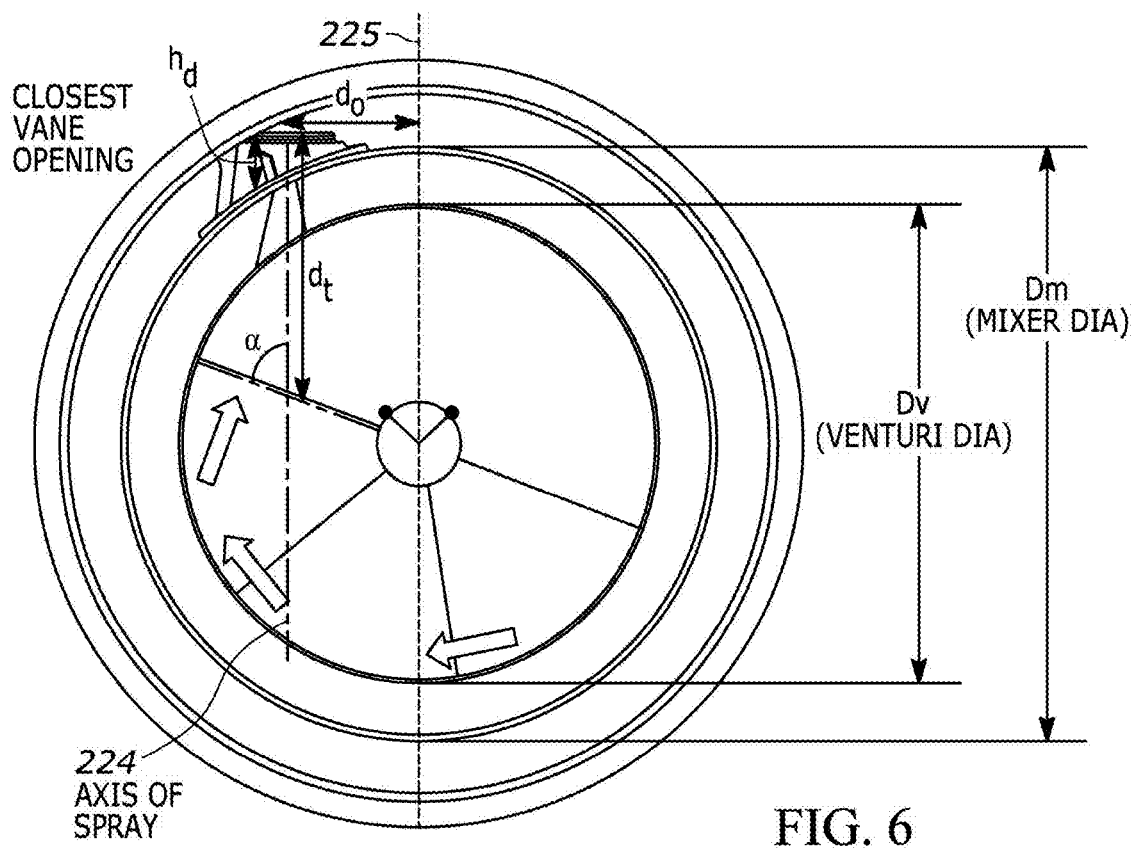
FIG. 6 is a partial cross-sectional view of the mixer shown in FIG. 2A, taken from an inlet port end of the mixer, and illustrating parameters of a convention that can be used to characterize features of embodiments.
Figure 7:
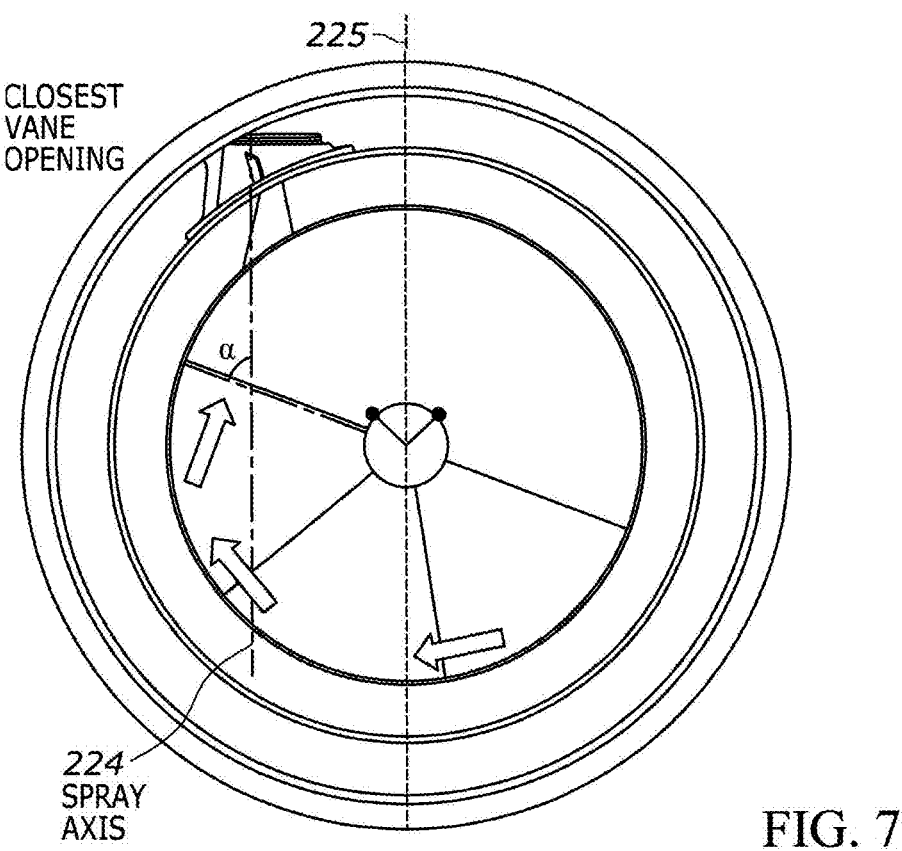
FIG. 7 is a partial cross-sectional view of the mixer shown in FIG. 2A, taken from an inlet port end of the mixer, and illustrating parameters of a convention that can be used to characterize features of embodiments.
Figure 11:
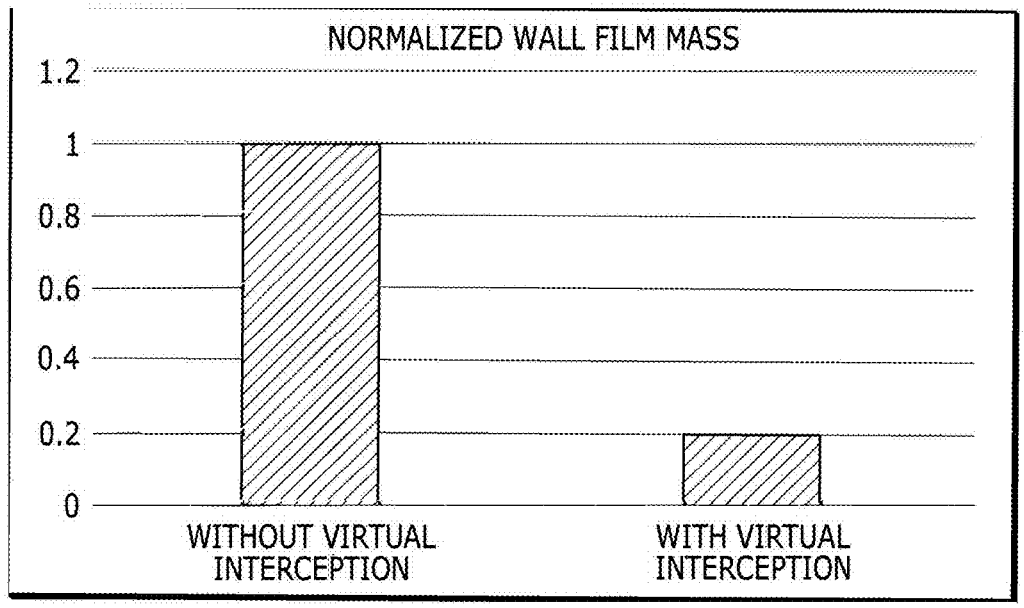
FIG. 11 is a comparative graph of modeled normalized reductant wall film mass of a mixer in accordance with embodiments, and a mixer without virtual interception.
Figure 12:
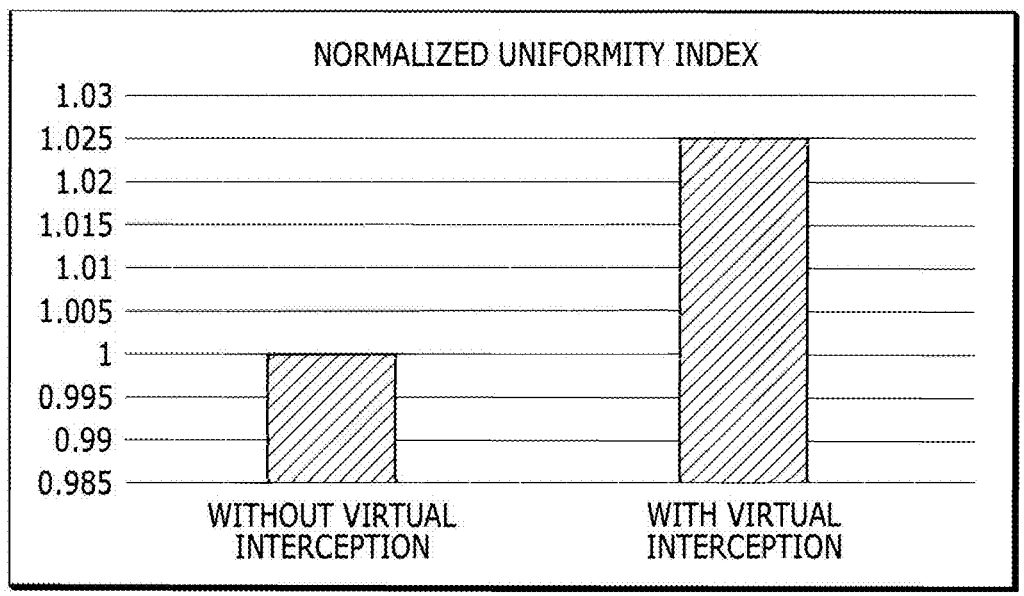
FIG. 12 is a comparative graph of modeled normalized reductant uniformity index of a mixer in accordance with embodiments, and a mixer without virtual interception.

Features of the mixer 200 that provide the virtual interception functionality can also be described and characterized as shown in FIGS. 6 and 7, where the mixer axis 225 is shown parallel to and offset by a doser offset distance do from the axis of spray or injection (i.e., the axis injection direction 224). FIG. 6 illustrates certain dimensional relationships and ranges of the mixer 200 when characterized by this convention. With reference to FIG. 6, the performance of embodiments of the mixer 200 can be optimized with the following features and parameters:

Venturi diameter Dv, 0.25 Dm≤Dv≤0.95 Dm
Shroud diameter Ds, 0.65 Dv≤Ds≤Dv
Doser offset distance $d_o$, 0.05 Dv≤do≤0.45 Dv
Hub diameter $D_h$, 0≤$D_h$≤0.3 Dv
Hub offset $h_o$, 0≤$h_o$≤0.4 Dv
Distance from closest vane opening to tip of doser, $$d_t = h_d + \sqrt{(0.25 D_m^2 - d_0^2)} - \frac{d_0}{\tan\alpha}$$

Height of doser mount $h_d$, 0≤$h_d$≤25 mm
Closest vane tip offset angle α for Virtual Interception, 30°≤α≤150°

With reference to FIG. 7, the performance of embodiments of the mixer 200 can be optimized with the following features and parameters:

Jet momentum ratio, $$q = \frac{\text{Liquid jet or spray momentum}}{\text{Momentum of Virtual Interception gas flow}}$$

If q is too high, reductant spray is unaffected by intercepting gas, while if q is too low, penetration of the spray into the mixer will be poor.

Vane angle θ, and closest vane tip offset angle for Virtual Interception α are chosen to give 30≤q≤1000 to selectively alter the trajectory of spray droplets and to redistribute them in various applications The performance of other embodiments can be optimized by features and parameters different than those described immediately above.

Virtual interception of the sprayed or otherwise introduced reductant using preferentially and intimately guided streams of swirling exhaust gases enables selectively altering the trajectory of the reductant droplets and redistribution of the droplets, without the use of splash plates or other solid devices. In embodiments, a relatively smaller venturi diameter Dv with respect to the mixer diameter Dm can increase wall shear; lower vane angle can keep pressure drops acceptable; and overlapping vanes can effectively guide the exhaust gas flow and reductant. The swirl velocity will be a function of the vane angles and exhaust flow rate. Selection of the clocking of the second flow device relative to the first flow device can be done to optimize a target reductant uniformity within a target mixer pressure drop.

Comparative Examples

FIGS. 8A and 8B, 9A and 9B, 10A and 10B, 11 and 12 illustrate modeled operational characteristics of a mixer such as 200 in accordance with embodiments described above versus a mixer without virtual introduction where the reductant is introduced in a direction that is not opposite the circumferential swirl direction of the exhaust gas. FIGS. 8A, 9A and 10A represent the mixer 200, whereas the corresponding FIGS. 8B, 9B and 10B represent the other mixer without virtual introduction. As shown by FIGS. 8A and 8B which compares velocity contours, in mixers such as 200 the exhaust gas virtually intercepts the reductant spray and redistributes the droplets to a substantially higher degree (e.g., spread of the spatial distribution) than the other mixer. As shown by FIGS. 9A and 9B which compares the distribution of reductant droplets of different diameters, distribution is significantly enhanced by the mixers such as 200. FIGS. 10A and 10B illustrate relative wall film thicknesses. Due to the improved spatial distribution by mixers such as 200, the reductant uniformity index is improved by 2.5% and the wall film mass is substantially reduced (e.g., 4.4% represented by FIG. 10A versus the 21.4% represented by FIG. 10B).

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in associate with another embodiment. The scope of the invention should, therefore, be determined with reference to the appended claims, along with the full scope of equivalents to which such claims are entitled.

What is claimed is:

1. An exhaust gas and reductant mixer, comprising:
   a body defining an exhaust gas flow path, wherein the exhaust gas flow path has a central portion;
   a first flow device to swirl the exhaust gas in a circumferential direction with respect to the gas flow path; and
   a reductant entry port to introduce the reductant into the gas flow path at a location downstream from the first flow device and in an introduction direction (1) offset from the central portion, and (2) opposite the circumferential direction.
2. The mixer of claim 1 wherein the introduction direction is a direction about an axis between 5° and 85° away from an axis extending from the reductant entry port to the central portion of the gas flow path.
3. The mixer of claim 1 wherein the introduction direction is a direction about an axis between 25° and 35° away from an axis extending from the reductant entry port to the central portion of the gas flow path.
4. The mixer of claim 1 and further including a doser for introducing a conical or fan shaped bolus of the reductant through the reductant entry port.
5. The mixer of claim 1 wherein:
   the body includes an exhaust inlet portion upstream from the reductant entry port; and
   the first flow device is located at the exhaust inlet portion.
6. The mixer of claim 1, wherein the mixer is free of splash plates.
7. The mixer of claim 1, wherein the first flow device comprises a plurality of vanes.
8. The mixer of claim 7 wherein each of the vanes of the first flow device defines a vane angle between 45° and 89° with respect to the gas flow path.
9. The mixer of claim 7 wherein each of the vanes of the first flow device defines a vane angle between 65° and 85° with respect to the gas flow path.
10. The mixer of claim 7 wherein each of the vanes of the first flow device defines a vane angle between 70° and 80° with respect to the gas flow path.
11. The mixer of claim 7 wherein two or more of the vanes of the first flow device overlap one another in the circumferential direction.
12. The mixer of claim 7 wherein two or more of the vanes of the first flow device have adjacent edges defining a gap in the circumferential direction.
13. The mixer of claim 7 wherein the reductant entry port and first flow device are configured to optimize mixing uniformity of the reductant in the exhaust gas flow.
14. The mixer of claim 7 wherein the vanes of the first flow device extend around a portion between 130° and 230° of a circumference of the gas flow path.
15. The mixer of claim 7 wherein the vanes of the first flow device extend around a portion between 170° and 190° of a circumference of the gas flow path.
16. The mixer of claim 7 wherein the vanes of the first flow device extend around a portion less than 360° of a circumference of the gas flow path.
17. The mixer of claim 16 and further including a first blocking member in a circumferential portion of gas flow path where the vanes of the first flow device do not extend and upstream from the reductant entry port.
18. The mixer of claim 17 wherein the first blocking member is located in a circumferential portion of the gas flow path corresponding to the location of the reductant entry port.
19. The mixer of claim 17 wherein the blocking member is located generally parallel to the first flow device.
20. The mixer of claim 1 and further including a second flow device at a location downstream from the reductant entry port to swirl the exhaust gas in a circumferential direction.
21. The mixer of claim 20 wherein the second flow device swirls the exhaust gas in the same circumferential direction that the first flow device swirls the exhaust gas.
22. The mixer of claim 20 wherein the second flow device swirls the exhaust gas in an opposite circumferential direction that the first flow device swirls the exhaust gas.
23. The mixer of claim 20 wherein a hub of one or both of the first flow device and the second flow device is radially offset from a mixer center axis.
24. The mixer of claim 20 wherein the second flow device comprises a plurality of vanes.
25. The mixer of claim 24 wherein each of the second flow device vanes defines a vane angle between 45° and 89° with respect to the gas flow path.
26. The mixer of claim 24 wherein each of the second flow device vanes defines a vane angle between 55° and 75°.
27. The mixer of claim 24 wherein two or more of the second flow device vanes overlap one another in the circumferential direction.
28. The mixer of claim 24 wherein two or more of the second flow device vanes have adjacent edges defining a gap in the circumferential direction.
29. The mixer of claim 24 wherein the reductant entry port and second flow device are configured to optimize mixing uniformity of the reductant in the exhaust gas flow.
30. The mixer of claim 24 wherein the vanes of the second flow device extend around a portion of between 200° and 280° of a circumference of the gas flow path.
31. The mixer of claim 24 wherein the vanes of the second flow device extend around a portion between 220° and 260° of a circumference of the gas flow path.
32. The mixer of claim 24 wherein the vanes of the second flow device extend around a portion of less than 360° of a circumference of the gas flow path.

33. The mixer of claim 32 and further including a second blocking member in a circumferential portion of gas flow path where the vanes of the second flow device do not extend and downstream from the reductant entry port.

34. The mixer of claim 33 wherein the second blocking member is located in a circumferential portion of the gas flow path corresponding the location of the reductant entry port.

35. The mixer of claim 33 wherein the second blocking member is located generally parallel to the vanes of the second flow device.

36. An exhaust aftertreatment system including the mixer of claim 1.

37. A method for mixing reductant in an exhaust gas flow, comprising:
  swirling the exhaust gas flow in a circumferential direction with respect to a flow path by a flow device; and
  introducing the reductant into the swirling exhaust gas flow at a location downstream from the flow device in a direction offset from a central portion of the flow and opposite the circumferential direction of the flow.

\* \* \* \* \*